(12) United States Patent
Wang et al.

(10) Patent No.: US 11,543,503 B2
(45) Date of Patent: Jan. 3, 2023

(54) MULTI-LINE LASER RADAR

(71) Applicant: HESAI TECHNOLOGY CO., LTD., Shanghai (CN)

(72) Inventors: Rui Wang, Shanghai (CN); Na Li, Shanghai (CN); Shaoqing Xiang, Shanghai (CN); Yifan Li, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 530 days.

(21) Appl. No.: 16/620,121

(22) PCT Filed: May 16, 2018

(86) PCT No.: PCT/CN2018/087045
§ 371 (c)(1),
(2) Date: Dec. 6, 2019

(87) PCT Pub. No.: WO2018/223821
PCT Pub. Date: Dec. 13, 2018

(65) Prior Publication Data
US 2020/0103508 A1   Apr. 2, 2020

(30) Foreign Application Priority Data

Jun. 7, 2017  (CN) .......................... 201720656433.1
Jun. 19, 2017  (CN) .......................... 201720713800.7
Dec. 8, 2017  (CN) .......................... 201711312298.X

(51) Int. Cl.
*G01S 7/497* (2006.01)
*G01S 7/484* (2006.01)
*G01S 7/4863* (2020.01)

(52) U.S. Cl.
CPC .............. *G01S 7/497* (2013.01); *G01S 7/484* (2013.01); *G01S 7/4863* (2013.01)

(58) Field of Classification Search
CPC ........ G01S 7/497; G01S 7/484; G01S 7/4863; G01S 7/4812; G01S 7/4813;
(Continued)

(56) References Cited

U.S. PATENT DOCUMENTS 5,898,483 A    4/1999  Flowers
8,085,389 B2  12/2011  Satzky et al.
(Continued)

FOREIGN PATENT DOCUMENTS

CN        1847881 A    10/2006
CN      101813779 A     8/2010
(Continued)

OTHER PUBLICATIONS

Non-Final Office Action dated Apr. 7, 2020, issued in related U.S. Appl. No. 16/784,155 (11 pages).
(Continued)

*Primary Examiner* — Seung C Sohn
(74) *Attorney, Agent, or Firm* — Sheppard Mullin Richter & Hampton LLP

(57) ABSTRACT

A multi-line Lidar is provided. The multi-line Lidar includes: a multi-line ranging laser emission module comprising one or more lasers; a multi-line ranging laser reception module comprising one or more photodetectors and adapted to detect a laser echo generated when a measurement laser emitted by the laser emission module is incident to an obstacle and is diffusedly reflected; a ranging information resolution module in electrical signal connection with the multi-line ranging laser emission module and the multi-line ranging laser reception module, and designed to calculate the distance, in each direction, to the obstacle by means of calculating the time difference between the emission of the measurement laser and the receiving of the laser echo; and a control circuit and an optical system correspond-
(Continued)

ingly configured for the multi-line ranging laser emission module and the multi-line ranging laser reception module.

17 Claims, 4 Drawing Sheets

(58) Field of Classification Search
CPC .... G01S 7/4815; G01S 7/4817; G01S 7/4865; G01S 17/42; G01S 17/931; G01S 7/4808; G01S 7/4861; G01S 7/4814; G01S 17/10; H02J 50/10; G01J 2001/446
See application file for complete search history.

(56) References Cited

U.S. PATENT DOCUMENTS

| | | | |
|---|---|---|---|
| 9,810,775 B1 | 11/2017 | Welford et al. | |
| 10,838,046 B2* | 11/2020 | Qiu | G01S 7/4815 |
| 11,249,192 B2* | 2/2022 | Crouch | G01S 17/42 |
| 2007/0177841 A1 | 8/2007 | Danziger | |
| 2010/0277713 A1 | 11/2010 | Mimeault | |
| 2011/0286009 A1 | 11/2011 | Lohmann | |
| 2012/0187283 A1 | 7/2012 | Yamada et al. | |
| 2014/0078489 A1 | 3/2014 | Hoashi | |
| 2014/0226145 A1 | 8/2014 | Steffey et al. | |
| 2016/0282468 A1* | 9/2016 | Gruver | G01S 17/93 |
| 2016/0327647 A1 | 11/2016 | Herbst et al. | |
| 2017/0090030 A1 | 3/2017 | Soreide et al. | |
| 2017/0155225 A1 | 6/2017 | Villeneuve et al. | |
| 2017/0350983 A1 | 12/2017 | Hall et al. | |
| 2018/0364333 A1* | 12/2018 | Jungwirth | G01S 7/4814 |

FOREIGN PATENT DOCUMENTS

| | | | | |
|---|---|---|---|---|
| CN | 203870253 U | | 10/2014 | |
| CN | 105824029 A | | 8/2016 | |
| CN | 205880217 U | | 1/2017 | |
| CN | 106443635 A | | 2/2017 | |
| CN | 106443699 A | | 2/2017 | |
| CN | 106707259 A | | 5/2017 | |
| CN | 206411269 U | | 8/2017 | |
| CN | 107167787 A | | 9/2017 | |
| CN | 107271983 A | | 10/2017 | |
| CN | 107272014 A | | 10/2017 | |
| CN | 107356930 A | | 11/2017 | |
| CN | 107367737 A | | 11/2017 | |
| CN | 207037085 A | | 2/2018 | |
| CN | 106443699 B | * | 2/2019 | G01S 17/08 |
| DE | 102014206898 A1 | | 10/2014 | |
| DE | 202014101753 U1 | | 7/2015 | |
| DE | 202014102451 U1 | | 8/2015 | |
| DE | 202014102451 | * | 10/2015 | G01S 7/481 |
| EP | 0665446 A2 | | 8/1995 | |
| EP | 2388619 A1 | | 11/2011 | |
| JP | 4-57983 B2 | | 9/1992 | |
| JP | 2000-097697 A | | 4/2000 | |
| JP | 2001-050723 A | | 2/2001 | |
| JP | 2008-298520 A | | 12/2008 | |
| JP | 2010-243491 A | | 10/2010 | |
| JP | 2013-156138 A | | 8/2013 | |
| JP | 2013-210316 A | | 10/2013 | |
| JP | 2015-021968 A | | 2/2015 | |
| JP | 2015-132600 A | | 7/2015 | |
| JP | 2015-132768 A | | 7/2015 | |
| WO | 2017/090228 A1 | | 6/2017 | |

OTHER PUBLICATIONS

PCT International Preliminary Reporton Patentability dated Dec. 19, 2019, issued in related International Application No. PCT/CN2018/087045, with English translation (14 pages).
First Search dated Jul. 17, 2019, issued in related Chinese Application No. 201711312298.X (2 pages).
First Office Action dated Jul. 25, 2019, issued in related Chinese Application No. 201711312298.X, with English machine translation (17 pages).
Second Office Action dated Oct. 16, 2019, issued in related Chinese Application No. 201711312298.X, with English machine translation (20 pages).
Abhishek Kasturi et al., "UAV-Bome LiDAR with MEMS Mirror Based Scanning Capability", SPIE Defense and Commercial Sensing Conference 2016, Apr. 20, 2016, Baltimore, MD (10 pages).
PCT International Search Report and the Written Opinion dated Aug. 3, 2018, issued in related International Patent Application No. PCT/CN2018/087045, with partial English translation (11 pages).
Extended European Search Report dated Feb. 15, 2021, issued in related European Application No. 18814389.5 (11 pages).
Non-Final Office Action dated Jan. 24, 2019, issued in related U.S. Appl. No. 16/161,694 (6 pages).
Notice of Reasons for Refusal dated Feb. 22, 2022, issued in related Japanese Application No. 2019-568157, with English machine translation (16 pages).

* cited by examiner

MULTI-LINE LASER RADAR

This application is a National Phase Application of PCT International Patent Application No. PCT/CN2018/087045, filed on May 16, 2018, which claims priority to Chinese Patent Application No. 201720656433.1, titled "WIRELESS COMMUNICATION APPARATUS AND LASER RADAR", filed with the Chinese Patent Office on Jun. 7, 2017, Chinese Patent Application No. 201720713800.7 titled "LASER RADAR BASED ON MULTIPLE LASER DEVICES WITH NONUNIFORM DISTRIBUTION", filed with the Chinese Patent Office on Jun. 19, 2017, and Chinese Patent Application No. 201711312298.X titled "LASER RADAR SYSTEM", filed with the Chinese Patent Office on Dec. 8, 2017, all of which are incorporated herein by reference in their entireties.

FIELD

The present disclosure relates to a multi-line Lidar.

BACKGROUND

Laser ranging technologies based on Time of flight have been widely applied to various fields.

For a single-line Lidar, only one beam of scanning laser is generated along an axial direction, and a two-dimensional scenario is sensed by changing an angle of the one beam of the scanning laser in a horizontal plane. That is, the single-line Lidar may sense a scenario in a plane or a curved surface scanned by the one beam of scanning laser. In an actual application, in order to sense a three-dimensional scenario by the single-line Lidar, the single-line Lidar is required to be moved so that various frames of two-dimensional images may be combined to generate a three-dimensional effect.

In order to obtain three-dimensional information of the scanned region as much as possible, a multi-line Lidar which can cover a larger vertical field of view is generally adopted. For the multi-line Lidar in the current market, the angular separations of the laser beams are uniformly distributed in a certain angle range (that is, the vertical angular resolution has pre-determined values). For example, for the 16-line, 32-line and 64-lineLidar Lidars of Velodyne, the vertical angular resolutions are 2 degrees, 1.33 degrees and 0.43 degree respectively. For the 4-line and 8-line Lidars of Ibeo, the vertical angular resolution is 0.8 degree.

A vehicle-mounted Lidar is mainly configured to detect pedestrians and vehicles or the like on the ground. In this case, if the vertical field of view has been evenly assigned in an upper field of view and a lower field of view, a substantial amount of the beams pointing upward are not useful.

In addition, if the distribution pattern of the current products is followed and the vertical angular separations are distributed uniformly, more lines are required to realize a higher vertical angular resolution, resulting in a higher cost, a larger volume and a lower reliability and stability. Due to the limitation of a data capacity of the Ethernet and a processing speed of the vehicle-mounted CPU, a Lidar with a higher number of laser beams cannot satisfy the requirements of both a high level of vertical angular resolution and a high scanning frequency of the Lidar.

If the number of lines is decreased based on the cost, the angular separation will become very large, and thus the target in a short distance range (for example 40m) may not be detected. For example, if the vertical field of view is 32° and the angular separation is 2° (the vertical resolution), 16 lines are required to cover the vertical field of view. As a result, the gap among laser beams at a distance of 40 m will be about 1.4 meters. With such a large gap, it is easy for the Lidar to miss a pedestrian.

According to a determination whether an emission optical path overlaps with a receiving optical path, the Lidar may be classified into a coaxial system and a non-coaxial system. For any Lidar, in order to ensure that all the emitted laser pulses enter a receiving field of view of the Lidar after passing through a blind area and a transition area of the Lidar, the emitted laser pulses should be parallel with an optical axis of a receiving telescope. Once directivity of the emitted beam changes, the overlap factor correction curve of the Lidar cannot be determined, and a correct correction result cannot be provided for the overlap region. The laser beam may deviate from the receiving field of view when the directivity severely deviates, resulting in that the Lidar cannot detect the obstacle.

In the conventional Lidar system, due to offset of a reflector, an operation ambient temperature of a semiconductor laser device, platform vibration, wavelength change and a service life of the semiconductor laser device, it is difficult to ensure that the emitted beams maintain coaxial or parallel to the optical axis of the receiving telescope in the non-coaxial Lidar system. In addition, space is scanned through rotation of one-dimensional galvanometer in the conventional Lidar system, and the requirement for scanning field of view of the Lidar cannot be satisfied. In addition, the rotation of the galvanometer is controlled through a mechanical structure, resulting in increased maintenance difficulty and limited measurement accuracy.

SUMMARY

An object of the present disclosure is to provide a multi-line Lidar, which can measure distances of obstacles in different directions, generate a three-dimensional point cloud, directly sense a three-dimensional scenario, and can detect a key region more accurately in a case of controlling a cost caused due to the number of laser beams of the Lidar.

The technical problem can be solved by a multi-line Lidar according to the present disclosure. The multi-line Lidar includes an emission module, a receiving module, a ranging information determination module and a control circuit and an optical system for the emission module and the receiving module. The emission module includes one or more laser devices. The receiving module includes one or more photon detectors and is configured to detect an echo signal generated by the backscattering of emitted laser beams by an obstacle. The ranging information determination module is coupled with the emission module and the receiving module via electrical signals, and is configured to determine distances of obstacles in predetermined directions based on a time delay between a first time instant when the emission module emits the measurement laser and a second time instant when the echo signal is received by the receiving module.

According to a preferred implementation of the multi-line Lidar of the present disclosure, the emission module is configured to emit multiple laser beams with nonuniform vertical angular resolutions. That is, angle differences between adjacent laser beams are not the same in a vertical direction. The nonuniform vertical angular resolutions indicate that the multiple laser beams are distributed with different densities for different heights. Compared with the laser beams with uniform spacing for detecting ranges, more laser beams can be provided to key height regions according to the solution of the present disclosure. In an embodiment, the numbers of the laser devices and the photon detectors correspond to the number of laser beams of the multi-line Lidar.

According to a preferred implementation of the multi-line Lidar of the present disclosure, the control circuit includes a time-to-digital converter. The ranging information determination module is configured to determine the time delay between the time instant when the emission module emits the laser beam and the time instant when the echo signal is received by the receiving module based on a time delay between a time instant when the emission module sends a first signal to the time-to-digital converter and a time instant when the receiving module sends a second signal to the time-to-digital converter in response to detecting return laser, to calculate the distance of the obstacles in the direction.

In an alternative implementation, the time delay is obtained indirectly by comparing current waveforms. The control circuit includes an analog-to-digital converter configured to collect and digitize, in real time, current waveforms of the emission module and the receiving module. The ranging information determination module is configured to compare the current waveform of the emission module and the current waveform of the receiving module for determining the time delay between the time instant when the emission module emits the laser beam and the time instant when the echo signal is received by the receiving module, to calculate the distance of the obstacles in the direction.

According to a preferred implementation of the multi-line Lidar of the present disclosure, the emission module is configured to transmit multiple laser beams in a manner that an upper region and a lower region have a sparer vertical angular resolution along a vertical field of view than a middle region. In this case, the emitted laser beams are distributed densely in a horizontal line and regions close to the horizontal line, and is distributed sparsely in other directions.

The emitted laser beams are distributed with such non-uniform vertical angular resolutions, so that a high vertical angular resolution can be realized with the low number of laser beams, thereby saving a cost and decreasing a volume of the device. In particularly, in consideration of a fact that obstacles to be identified (such as pedestrians and vehicles) during traveling of a vehicle are generally focused at the horizontal line and regions close to the ground, the distribution density of central laser beams (at the horizontal line and near the horizontal line) is increased, and such nonuniform laser beam distribution is more scientific and reasonable for the actual traffic environment. From another angle, the number of laser beams is decreased in a non-key regions accordingly when the number of laser beams in the key regions is increased, so that the total number of laser beams is controlled, thereby ensuring realization of a high scanning frequency, and generating a more accurate scanning result in a case of meeting requirements of a high horizontal angular resolution and the high scanning frequency.

A technical solution regarding various angles at which the laser beam scans over time in the vertical direction is provided. For example, in an alternative implementation, the multiple laser beams emitted from the emission module include one beam of laser having an angle changing over time in the vertical direction. In another alternative implementation, the multiple laser beams emitted by the laser emission module include multiple beams of laser having angles changing over time in the vertical direction.

According to a preferred implementation of the multi-line Lidar of the present disclosure, the multi-line Lidar further includes a scanning module configured to change an angle of the multiple laser beams over time in the vertical direction. The laser beam having the angle changing over time in the vertical direction may be deflected to a corresponding angle in the vertical direction by, for example, one-dimensional or two-dimensional galvanometer. The galvanometer is configured to change the angle of the laser beam over time in the vertical direction.

In an embodiment, a dichroic module is arranged in an emission optical path and a receiving optical path of the multi-line Lidar, and the dichroic module is disposed on a same axis with the emission module and the scanning module. The dichroic module is configured to transmit a laser beam emitted from the emission module to the scanning module and reflect an echo signal from an obstacle of the scanning module to the receiving module.

According to a preferred implementation of the multi-line Lidar of the present disclosure, the multi-line Lidar further includes: a rotating structure, a stationary structure, a rotation mechanism, a communication system and an electrical energy transmission system. The emission module and the receiving module are attached to the rotating structure. The stationary structure has an external communication interface and an external power supply interface. The electrical energy transmission system supplies external electrical energy to the rotating structure via the external power supply interface. The rotation mechanism is configured to drive the rotating structure to rotate with respect to the stationary structure, and includes a feedback device. The feedback device is configured to detect a rotational angle of the rotation mechanism in a horizontal direction. The communication system and the electrical energy transmission system are arranged between the stationary structure and the rotating structure. In this case, spatial angles when the laser beam encounters the obstacle can be determined, and thus a position and a shape of the obstacle can be determined according to the spatial angles in combination with the distance of the obstacles calculated based on the time delay.

The stationary structure is configured to fix the multi-line Lidar with an external connection structure. The external communication interface provided in the stationary structure is configured to receive an external instruction, and transmit point cloud information and so on scanned by the multi-line Lidar to the outside. The external power supply interface is configured to receive electrical energy inputted from the outside.

The rotating structure may rotate around a fixed axis in a vertical direction. The axis may be installed on the stationary structure or the rotating structure. With rotation of the rotating structure, the emission module and the receiving module perform measurements for different angles in the horizontal direction.

According to a preferred implementation of the multi-line Lidar of the present disclosure, the stationary structure is provided with an emission coil and a first modulation circuit, and the rotating structure is provided with a receiving coil and a second modulation circuit. Electrical energy is transmitted from the emission coil to the receiving coil by electromagnetic induction.

In an alternative implementation, the stationary structure is connected to the rotating structure via a slip ring. The slip ring includes two portions which are rotatable to each other and are connected to the stationary structure and the rotating structure respectively. A conductive channel is formed the two portions of the slip ring. The conductive channel is configured to transmit electrical energy between the stationary structure and the rotating structure.

According to a preferred implementation of the multi-line Lidar of the present disclosure, the communication system between the stationary structure and the rotating structure includes a signal channel formed by the two portions of the slip ring.

In an alternative implementation, communication between the stationary structure and the rotating structure is performed by photoelectric conversion. Here, the communication system between the stationary structure and the rotating structure includes: a light emitting diode arranged on the stationary structure, a photodiode arranged on the rotating structure, a light emitting diode arranged on the rotating structure and a photodiode arranged on the stationary structure. The light emitting diode arranged on the stationary structure is configured to convert an electrical signal to be transmitted into an optical signal, and the optical signal is captured and converted into an electrical signal by the photodiode arranged on the rotating structure. The light emitting diode arranged on the rotating structure is configured to convert an electric signal to be transmitted into an optical signal, and the optical signal is captured and converted into an electrical signal by the photodiode arranged on the rotating structure.

In addition, any conventional wireless sending and receiving device may be considered. For example, in alternative implementations, the communication system between the stationary structure and the rotating structure may include a wireless transmitter and a wireless receiver that transmits or receives signals using, for example, radio, WiFi and Bluetooth, arranged on the stationary structure and the rotating structure respectively.

According to a preferred implementation of the multi-line Lidar of the present disclosure, the emission module includes multiple laser devices fixedly arranged in the rotating structure, to realize the nonuniform vertical angular resolutions of the emitted multiple laser beams. The multiple laser devices are grouped into multiple groups. Each group of laser devices are spaced equally in the vertical direction, and gaps between adjacent laser devices in different groups may be same or different, as long as the emitted multiple laser beams have a vertical angular resolution focusing on a key region.

In an embodiment, the key region indicates a middle region in a vertical field of view angle range of the emission module. That is, compared with an upper region and a lower region of the vertical field of view angle range of the emission module, more laser devices emit laser beams to the middle region of the vertical field of view angle range.

According to a preferred implementation of the multi-line Lidar of the present disclosure, the laser devices are fixedly arranged on multiple supporting structures in the rotating structure. The supporting structures are arranged so that more laser devices emit laser beams to the middle region of the vertical field of view angle range of the emission module, compared with the upper region and the lower region of the vertical field of view angle range. Similar, the laser devices may be spaced equally or spaced unequally on the supporting structures. Gaps between adjacent laser devices in different supporting structures may be same or different.

According to a preferred implementation of the multi-line Lidar of the present disclosure, a first vertical plane in which the laser beam emitted by the emission module and a second vertical plane in which the echo signal is received by the receiving module are symmetric with respect to a vertical plane that passes through a rotation center of the rotating structure.

BRIEF DESCRIPTION OF THE DRAWINGS

The above attributes, features and advantages of the present disclosure and implementations thereof become clearer and easier to be understood through the following illustrative description of embodiments, and are explained in detail with reference to the accompanying drawings hereinafter.

DETAILED DESCRIPTION OF EMBODIMENTS

Figure 1:
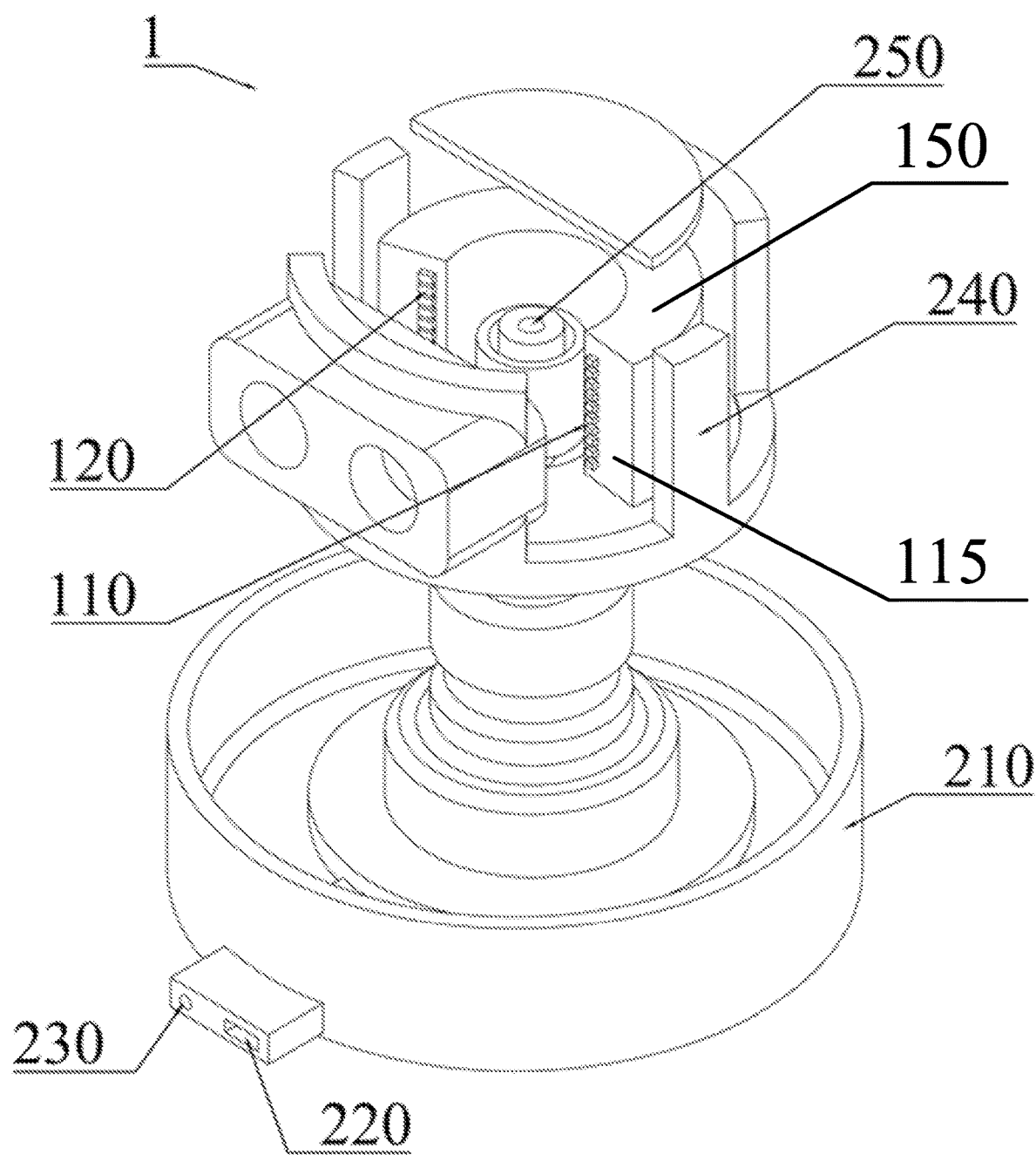
FIG. 1 is a schematic structural diagram of a multi-line Lidar according to the present disclosure.

FIG. 1 shows a multi-line Lidar 1 according to a first embodiment of the present disclosure. The multi-line Lidar 1 includes a stationary structure 210, a rotating structure 240, and a rotation mechanism 250 for driving the rotating structure 240 to rotate with respect to the stationary structure 210. A communication system and an electrical energy transmission system are further provided between the stationary structure 210 and the rotating structure 240.

A main body of the stationary structure 210 is a machined metal housing. A rotary axis penetrating the whole multi-line Lidar 1 in a vertical direction is provided at a center of the stationary structure 210. Rotary components of the multi-line Lidar system (the rotating structure 240, and communication/electrical energy transmission system between the stationary structure 210 and the rotating structure) each are installed on the rotary axis. In addition, the stationary structure is provided with a circuit board. The circuit board is configured to convert a power supply voltage in a wide range (such as, ranging from 7V to 32V) inputted from the outside into a voltage required for the multi-line Lidar system (such as 12V, 5V and 3.3V), convert an instruction and a GPS time synchronization signal sent from the outside into an instruction and a GPS time synchronization signal with a format acceptable by an internal circuit system of the multi-line Lidar, and convert point cloud information obtained by scanning by the Lidar into information with a format acceptable by the outside and output the information. An external data interface of the Lidar may be Ethernet, CAN bus, USB and so on.

A main body of the rotating structure 240 is also a machined metal housing. The rotating structure 240 is installed on a rotary axis of the stationary structure through one or more bearings and is rotatable around the rotary axis.

The stationary structure 210 is configured to fix the multi-line Lidar 1 with an external connection structure. The external communication interface 220 provided in the stationary structure 210 is configured to receive an external instruction, and transmit point cloud information scanned by the multi-line Lidar 1 to the outside and so on. The external power supply interface 230 is configured to receive electrical energy inputted from the outside. The external electrical energy is inputted from the external power supply interface 230 to the stationary structure, and provided to the rotating structure 240 via an electrical energy transmission system between the stationary structure 210 and the rotating structure 240. The communication and electrical energy transmission between the stationary structure 210 and the rotating structure 240 is realized through the communication system and the electrical energy transmission system between the stationary structure 210 and the rotating structure 240. The communication system and the electrical energy transmission system between the stationary structure 210 and the rotating structure 240 are mainly configured to realize reliable data transmission and electrical energy transmission between two movable connection structures. In the embodiment, communication and electrical energy transmission are realized through a slip ring. A stator of the slip ring is connected to the stationary structure 210 of the Lidar, and a rotor of the slip ring is connected to the rotating structure 240 of the Lidar. During rotation, a signal is transmitted through a signal channel formed by the slip ring, and electrical energy is transmitted through a conductive channel formed by the slip ring.

Multiple emission modules 110 for emitting multiple laser beams for detecting ranges and receiving modules 120 for receiving an echo signal are fixedly arranged on the rotating structure 240. The emission module 110 emits multiple beams of lasers with different fixed angles in a vertical direction. The receiving module 120 detects an echo signal generated by the backscattering of emitted laser beams by an obstacle. In the embodiment, the emission module 110 is implemented as multiple laser devices 112, such as a semiconductor laser device with TO package or chip packaging. Multiple laser devices 112 are arranged at different positions in a single circuit board. A control circuit 115 of each for the laser devices 112 intermittently emits pulse current to drive the laser device 112 to emit a laser pulse.

Light emitted from a single laser device 112 is collimated through an optical system of the emission module 110, thereby forming approximately parallel beams. The laser devices 112 are located near a focal plane of an optical system of the emission module. Therefore, light emitted by the laser devices 112 having different positions in the vertical direction forms beams with different angles in the vertical direction after passing through the optical system of the emission module.

In the embodiment, the receiving module 120 is implemented as multiple photon detectors, such as photodiodes, particularly avalanche photodiodes. Multiple photon detectors are arranged at different positions in a signal circuit board.

The photon detector is arranged near the focal plane of the optical system of the receiving module 120. Each photon detector is configured to receive light in a direction the same as a direction of a beam of laser emitted by the laser emission module. A receiving field of view angle of each photon detector is determined based on a size of a photo-surface of the photon detector and a focal length of the optical system of the receiving module. The receiving field of view angle of the photon detector should be designed as small as possible, to reduce interference from ambient light. An optical signal received by the photon detector is converted into an electrical signal through a subsequent circuit, for calculating time of flight of the optical pulse.

The emission module 110 sends a signal to a corresponding time-to-digital converter in emitting each line of ranging laser, and the receiving module 120 sends a signal to the time-to-digital converter in response to detecting return laser. The ranging information determination module 150 is coupled with the emission module 110 and the receiving module 120 via an electrical signal. The ranging information determination module obtains a time delay between a time instant when the laser is emitted and a time instant when the echo signal is received, by calculating a time delay of the two signals above, that is, time of flight of the laser, thereby calculating distances of the obstacles Z in predetermined directions. Here, the ranging information determination module is arranged on the rotating structure. After obtaining the distance of the obstacles for each beam of laser in the vertical direction, the ranging information determination module transmits the ranging information to circuits on the stationary structure separately or by packaging through the communication system between the stationary structure and the rotating structure. A three-dimensional scenario around the Lidar can be established according to the ranging information. In other embodiments, the ranging information determination module may be arranged on the stationary structure, or a part of the ranging information determination module is arranged on the rotating structure and another part of the ranging information determination module is arranged on the stationary structure.

In the embodiment, the rotation mechanism 250 includes a direct current brushless motor with hollow shaft. A rotary axis passes through a hollow part of the motor, a stator of the motor is fixed to the stationary structure 210 of the multi-line Lidar 1 via threaded connection, and via a coupler a rotor of the motor is connected to the rotating structure 240 of the multi-line Lidar 1. The rotation of the motor drives the rotor of the Lidar to rotate. In addition, the rotation mechanism 250 includes a photoelectric encoder serving as a rotational angle feedback device. A coded disc of the photoelectric encoder is installed on the rotating structure 240 of the Lidar, and a photon detector of the photoelectric encoder is installed on the stationary structure of the Lidar and directly faces grids of the coded disc. When the motor drives the rotating structure 240 of the Lidar to rotate, a control circuit of the motor obtains information of the rotating structure 240 such as a rotational angle and a rotation speed by reading a signal returned by the photoelectric encoder, thereby obtaining angles of the measurement lasers in the horizontal direction.

The direct current brushless motor is driven by a special drive circuit. A rotation speed of the motor is controlled to be in a certain range by a closed-loop control system. The speed of the motor may be fed back from the photoelectric encoder or a back electromotive force and current of the motor measured by the drive circuit of the motor. The close-loop control algorithm may be implemented by a special motor drive chip (such as TI DRV 10983), a single chip microcomputer or FPGA. The whole motor control circuit may be implemented as a single circuit board. In a case that the motor is installed in the stationary structure of the Lidar, the motor control circuit may be integrated on a circuit board in the rotating structure.

A multi-line Lidar 1 is provided according to a second embodiment of the present disclosure. The second embodiment differs from the first embodiment in that: the emission module 110 emits a single beam or multiple beams of lasers having changed angles in the vertical direction, and echo signals generated by the backscattering of emitted laser beams by the obstacle Z are detected by the receiving module 120. In addition, the emission module 110 includes multiple circuit boards provided with laser devices 112, and the circuit boards are arranged at different positions spatially. Similarly, the receiving module 120 also includes multiple circuit boards provided with photon detectors, and the circuit boards are arranged at different positions spatially.

The analog-to-digital converter of the ranging information determining module collects a current waveform of laser emitted by the laser emission module and a current waveform of laser received by the laser receiving module in real time, and digitizes, in real time, the current waveforms and inputs the digitized current waveforms into a single chip microcomputer or FPGA with a time calculating function. The single chip microcomputer or FPGA calculates a time delay between the emission waveform and the receiving waveform, and thus a flying distance of the laser is obtained, thereby calculating a distance of the obstacles Z in the direction.

In addition, in the embodiment, communication between the stationary structure 210 and the rotating structure 240 is realized through optical transmission. The communication system between the stationary structure 210 and the rotating structure 240 includes: a light emitting diode arranged on the stationary structure 210, a photodiode arranged on the rotating structure, a light emitting diode arranged on the rotating structure 240 and a photodiode arranged on the stationary structure. The light emitting diode arranged on the stationary structure 210 converts an electrical signal to be transmitted into an optical signal, and the optical signal is captured and converted into an electrical signal by the photodiode arranged on the rotating structure 240. The light emitting diode arranged on the rotating structure 240 converts an electrical signal to be transmitted into an optical signal, and the optical signal is captured by the photodiode arranged on the rotating structure 210.

In addition, in the embodiment, electrical energy is transmitted between the stationary structure 210 and the rotating structure 240 by electromagnetic induction. The stationary structure of the multi-line Lidar 1 is provided with an emission coil, and the rotating structure of the multi-line Lidar 1 is provided with a receiving coil. Both the emission coil and the receiving coil are sleeved on the rotary axis of the Lidar. During the rotation of the rotating structure, a small gap is maintained between the two coils all the time. The inputted electrical energy is converted into alternating current via a modulation circuit, an alternating magnetic field is generated on the emission coil, and thus electromotive force is induced on the receiving coil. The alternating current on the receiving coil is converted into direct current required by a circuit system of the rotating structure via the modulation circuit.

A multi-line Lidar 1 is provided according to a third embodiment of the present disclosure. The third embodiment differs from the above embodiments in that: the communication between the stationary structure 210 and the rotating structure 240 is realized through a wireless sending device and a wireless receiving device arranged on the stationary structure 210 and the rotating structure 240 respectively, instead of realizing through slip ring connection or a photoelectric manner. Practically, the communication may be implemented by WiFi or Bluetooth.

A multi-line Lidar 1 is provided according to a fourth embodiment of the present disclosure. In which, laser devices 112 or laser device unit array is arranged appropriately, so that the generated laser beams are distributed in a nonuniform mode in a vertical field of view range of −16°~+7° (a nonuniform field of view from the up and the low). In which, a vertical angular resolution corresponding to a range of +2°~+7° is 1° (corresponding to the first to sixth laser beam). A range of −6°~+2° is an encryption subdivision segment, and has a vertical angular resolution of ⅓° (corresponding to the sixth to the thirtieth laser beam). A vertical angular resolution corresponding to a range of −16°~−6° is 1° (corresponding to the thirtieth to fortieth laser beam). Apparently, the above resolutions can be realized by alternately arranging the laser devices 112 or realized by multiple unit arrays consist of the laser devices 112. Alternatively, in a variation of the embodiment, laser beams with a nonuniform distribution can be realized by the laser devices 112 or detectors spaced unequally in the same array.

Regarding the generation of multiple laser beams, a fifth embodiment according to the present disclosure differs from the fourth embodiment in that: multiple laser beams formed by a single beam of measurement laser changing over time are disclosed. Here, the multiple laser beams are not multiple beams of laser emitted from multiple laser devices 112 simultaneously, but is a single beam of laser emitted by a single laser device 112 in combination with a galvanometer or a similar object, and an angle of the laser changes over time to perform multi-line scanning. According to the principle, the laser beam emitted from the laser emission module passes through the dichroic module 140, and then is reflected to a target object (or the obstacle Z) through a one-dimensional galvanometer or a two-dimensional galvanometer. The laser beam is reflected by the target object (or the obstacle Z), is incident to the dichroic module 140 via the galvanometer, and then is transmitted to a receiving focus element (such as a lens or a lens group). The laser is converged by the lens and then is incident to a detector module. The detector calculates time of flight of the laser by recording a time delay between a time instant when the laser is emitted and a time instant when an echo signal is received, thereby obtaining distance information of an object to be detected at this point. At a next time instant, the galvanometer reflects the laser to a next point in space, and the detector obtains distance information on the point. The measurement process is repeated in cooperation with rotation of the lens, thereby completing scanning of the space by the single beam of laser at a certain time period, and thus performing multi-line scanning on point cloud information in a whole detection range.

According to a variation of the fifth embodiment, for example, the galvanometer is combined with multiple laser devices 112 arranged fixedly, to generate multiple beams of laser having angles changing in the vertical direction. For example, in order to realize the effect of forty lines, five laser devices 112 are adopted, and a single beam of laser emitted from each laser device 112 is controlled to change an angle over time by a one-dimensional galvanometer or two-dimensional galvanometer to perform multi-line scanning, thereby completing scanning in a certain range. The five laser devices 112 together realize the effect of forty lines scanning.

Figure 5:
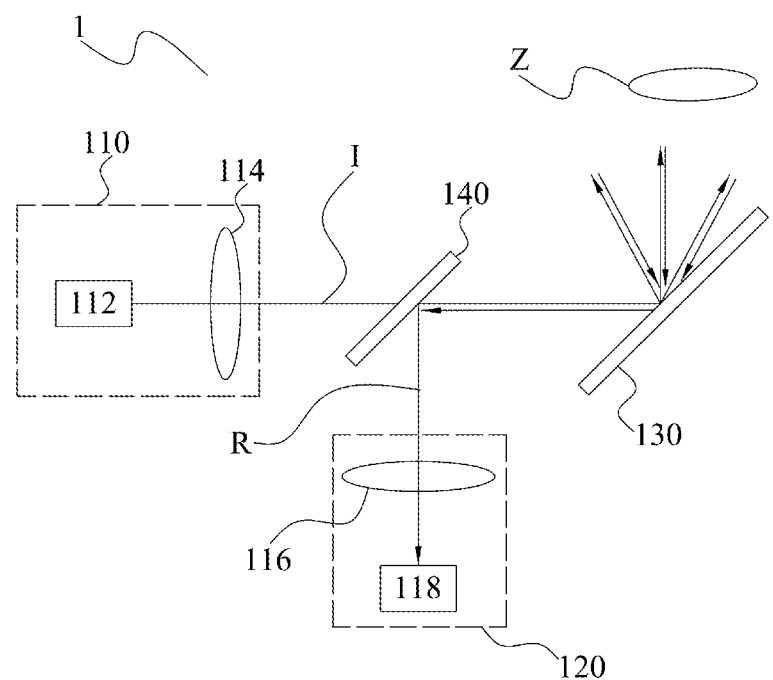
FIG. 5 schematically shows an embodiment of a multi-line Lidar according to the present disclosure, in which, an emission module for emitting multiple laser beams for detecting, a dichroic module and a scanning module are arranged on a same axis.
Figure 6:
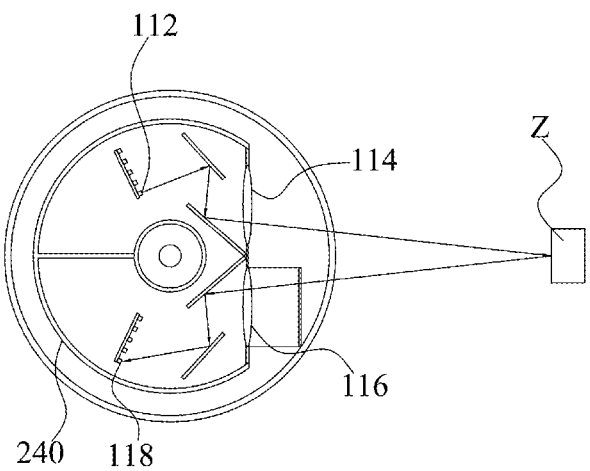
FIG. 6 schematically shows the emission module and the receiving module symmetrically arranged with respect to a vertical plane passing through a rotation center of a rotating structure.

According to a sixth embodiment of the present disclosure, as shown in FIG. 5, the emission module 110 (including a laser device 112 and a collimation module 114), the dichroic module 140 and the scanning module 130 are arranged on a same axis, so that an emission optical path I and a receiving optical path R maintain a coaxial effect. The ranging laser transmitting the dichroic module 140 is reflected to the obstacle Z in the surrounding space by a galvanometer which can freely swing in a horizontal and/or vertical space, and a reflection echo laser of the obstacle Z reflected by the scanning module is reflected to the receiving module 120.

The laser device 112 of the emission module 110 may be a semiconductor laser device, a fiber laser device and so on. Different types of laser devices can emit laser pulses with different wavelengths. For example, the semiconductor laser device may generate and emit an infrared pulse. In specific implementation, in order to avoid interference between different Lidar systems, the emission module 110 may be controlled to generate and emit laser pulses with a predetermined length.

The receiving module may include a converging module 116 and a detecting module 118. The detecting module 118 may be a photon detector. The converging module 116 and the collimation module 114 of the emission module 110 may be lens.

The dichroic module 140 may be a perforated reflector, a semi-transparent mirror, a polarizing beam splitter and a coated reflector and so on. The dichroic module 140 is configured to transmit parallel laser pulses adjusted by the collimation module 114, and reflect echo laser pulses reflected by the reflection scanning module 17.

The scanning module 130 may be a one-dimensional or two-dimensional galvanometer, for example, an electrostatic galvanometer, a battery galvanometer, a voltage galvanometer and an electric heating galvanometer.

Figure 2:
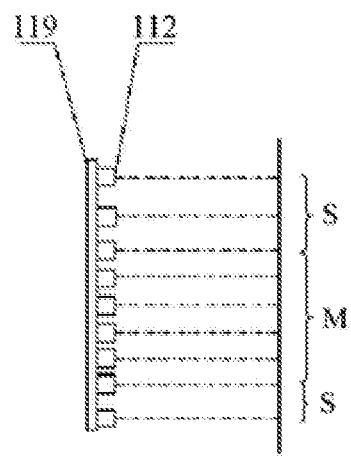
FIG. 2 schematically shows multiple laser devices of an emission module for emitting multiple laser beams for detecting fixedly arranged in a rotating structure; in which, more laser devices emit laser beams to a middle region compared with an upper region and a lower region.

According to a seventh embodiment of the present disclosure, in order to cause upper and lower regions S have a sparser vertical angular resolution than a middle region M in the vertical field of view angle range, the multiple laser devices 112 are arranged nonuniformly in the vertical direction, that is, the density of the laser devices is first increased and then decreased from top to bottom, as shown in FIG. 2. In order to realize the nonuniform distribution, the multiple laser devices 112 fixedly arranged in the rotating structure may be grouped into multiple groups according to different gaps between the laser devices. Denser laser beams are distributed in the key middle region in the above angle range.

According to a variation of the seventh embodiment, the rotating structure is provided with multiple supporting structures 119. The laser devices 112 are arranged fixedly on the supporting structures 119 respectively, so that laser beams emitted from more laser devices 112 are distributed in the middle region M of the angle range of the laser beam emitted from the emission module 110, compared with the upper and lower regions S of the angle range.

Figure 3:
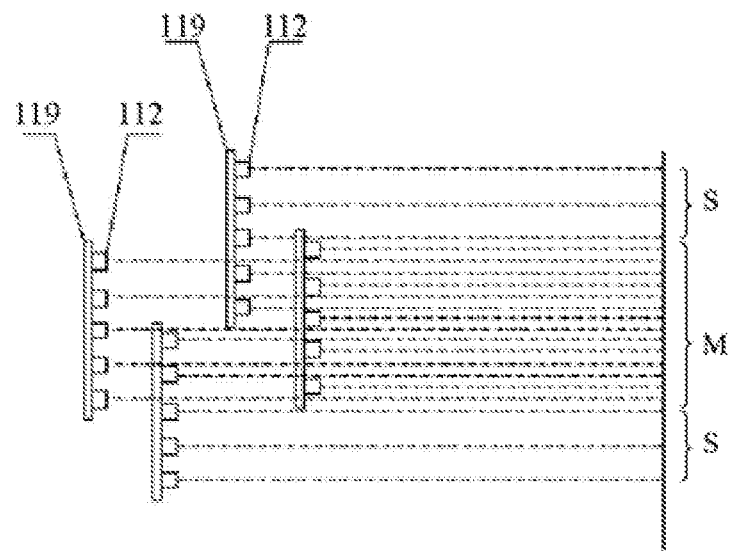
FIG. 3 schematically shows that laser devices are arranged on multiple supporting structures; in which, more laser beams are emitted into the middle region by superposing of the number of supporting structures in the middle region.

FIG. 3 schematically shows that the laser devices are arranged on multiple supporting structures. Optical paths of the laser devices 112 arranged on the supporting structures 119 are arranged alternately and superpose, so that more laser beams are emitted to the middle region by superposing of the number of the supporting structures 119.

Figure 4:
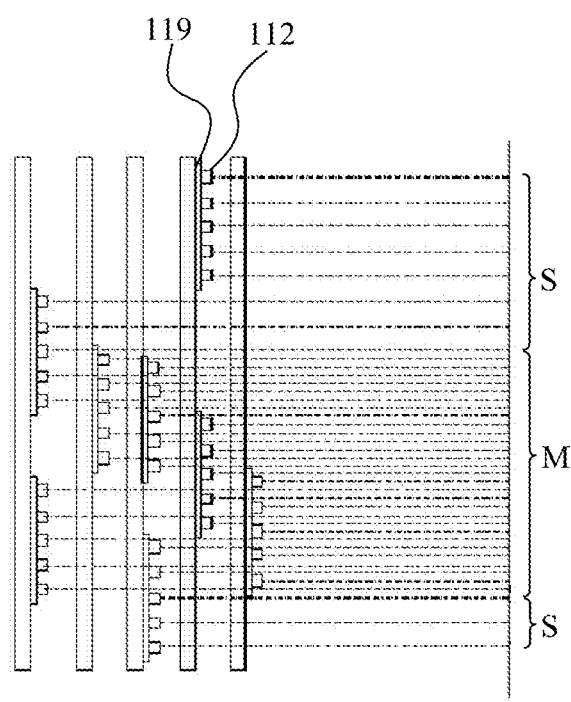
FIG. 4 schematically shows another example in which laser devices are arranged on multiple supporting structures, each supporting structures supports multiple groups of laser devices, and more groups of laser devices superpose in the middle region.

FIG. 4 schematically shows another example in which the laser devices are arranged on the supporting structures. FIG. 4 shows eight supporting structures 119, five laser devices 112 are arranged on each supporting structure 119, and the laser devices 112 are spaced equally. Five fixing plates are vertically arranged in an emission cavity and are separated from each other in a horizontal direction. The supporting structures 119 are fixed at a lateral portion of the fixing plate. The numbers of supporting structures fixed on different fixing plates are different, for example, the numbers of supporting structures 119 fixed on each fixing plate, from left to right, are 2, 1, 2, 2 and 1 respectively. Projection points of the laser devices 112 in a vertical plane including a main axis of the light collimation device have different density distribution in the up-down direction, for example, dense in the middle region and sparse in the upper and lower regions, so that the multiple beams of detection laser emitted from the laser devices 112 are distributed densely at the horizontal line and regions close to the horizontal line, and are distributed sparsely in other directions.

The preferred embodiments of the present disclosure are described above, but the disclosed embodiments are not intended to limit the spirit and scope of the present disclosure. Those skilled in the art can make more embodiments and applications according to teaching of the present disclosure, and these embodiments and applications should not be regarded as departing from the spirit and scope of the present disclosure. The spirit and scope of the present disclosure are defined by the claims rather than the specific embodiments.

REFERENCE NUMERAL LIST

1 Multi-line Lidar
110 Emission module for emitting multiple laser beams for detecting ranges
120 Receiving module for receiving an echo signal
210 Stationary structure
220 External communication interface
230 External power supply interface
240 Rotating structure
250 Rotation mechanism
130 Scanning module
140 dichroic module
112 Laser device
114 Collimation module
116 Converging module
118 Detecting module
119 Supporting structure
I Emission optical path
R Receiving optical path
Z Obstacle
S Upper and lower regions
M Middle region

The invention claimed is:
1. A multi-line Lidar, comprising:
a rotating structure comprising an emission module and a receiving module;
the emission module comprising a plurality of laser devices and configured to emit a plurality of laser beams for detecting ranges, wherein the plurality of laser devices are disposed on at least one supporting structure having an axis in a vertical direction, wherein a distribution density of laser devices at a middle region of the at least one supporting structure along the vertical direction is greater than a distribution density of laser devices at an upper region and a lower region of the at least one supporting structure along the vertical direction;

the receiving module comprising one or more photon detectors and configured to detect an echo signal generated by backscattering of the plurality of laser beams by one or more obstacles;

a ranging information determination module coupled with the emission module and the receiving module via electrical signals, and configured to determine one or more distances of the one or more obstacles in predetermined directions based on a time delay between a first time instant when the emission module emits the plurality of laser beams and a second time instant when the echo signal is received by the receiving module; and a control circuit and an optical system for the emission module and the receiving module.

2. The multi-line Lidar according to claim 1, wherein the emission module is configured to emit the plurality of laser beams with nonuniform vertical angular resolutions.

3. The multi-line Lidar according to claim 1, wherein the control circuit comprises a time-to-digital converter, and the ranging information determination module is configured to determine the time delay based on a first signal sent by the emission module to the time-to-digital converter and a second signal sent by the receiving module to the time-to-digital converter.

4. The multi-line Lidar according to claim 1, wherein
the control circuit comprises an analog-to-digital converter configured to collect and digitize, in real time, current waveforms of the emission module and the receiving module; and
the ranging information determination module is configured to compare the current waveform of the emission module and the current waveform of the receiving module for determining the time delay.

5. The multi-line Lidar according to claim 1, wherein the emission module is configured to transmit the plurality of laser beams in a manner that laser beams in the upper region and the lower region have a sparser vertical angular resolution along a vertical field of view than laser beams in the middle region.

6. The multi-line Lidar according to claim 1, further comprising: a scanning module configured to change an angle of the plurality of laser beams over time in the vertical direction.

7. The multi-line Lidar according to claim 6, further comprising:
a dichroic module disposed on a same axis with the emission module and the scanning module, wherein the dichroic module is configured to transmit a laser beam emitted from the emission module to the scanning module and reflect an echo signal of the laser beam to the receiving module.

8. The multi-line Lidar according to claim 1, further comprising:
a stationary structure, wherein the stationary structure has an external communication interface and an external power supply interface, and an electrical energy transmission system supplies external electrical energy to the rotating structure via the external power supply interface;

a rotation mechanism configured to drive the rotating structure to rotate with respect to the stationary structure, wherein the rotation mechanism comprises a feedback device configured to detect a rotational angle of the rotation mechanism in a horizontal direction;

a communication system for transmitting signals between the rotating structure and the stationary structure; and the electrical energy transmission system for transmitting electrical energy between the rotating structure and the stationary structure.

9. The multi-line Lidar according to claim 8, wherein the stationary structure is provided with an emission coil and a first modulation circuit, the rotating structure is provided with a receiving coil and a second modulation circuit, and the emission coil and the receiving coil are configured to transmit electrical energy from the emission coil to the receiving coil by electromagnetic induction.

10. The multi-line Lidar according to claim 8, wherein the stationary structure is connected to the rotating structure via a slip ring having two portions that form a conductive channel, and the conductive channel is configured to transmit electrical energy between the stationary structure and the rotating structure.

11. The multi-line Lidar according to claim 10, wherein the two portions of the slip ring further form a signal channel.

12. The multi-line Lidar according to claim 8, wherein
the communication system arranged between the stationary structure and the rotating structure comprises a first light emitting diode and a first photodiode disposed on the stationary structure and a second light emitting diode and a second photodiode disposed on the rotating structure.

13. The multi-line Lidar according to claim 8, wherein the communication system between the stationary structure and rotating structure comprises a wireless transmitter and a wireless receiver arranged on the stationary structure and the rotating structure respectively, and the wireless transmitter transmits signals and the wireless receiver receives signals using radio, WiFi, or Bluetooth.

14. The multi-line Lidar according to claim 8, wherein the emission module further comprises a second plurality of laser devices.

15. The multi-line Lidar according to claim 14, wherein the second plurality of laser devices are attached to a second supporting structure.

16. The multi-line Lidar according to claim 8, wherein a first vertical plane of the emission module and a second vertical plane of the receiving module are symmetrical with respect to a vertical plane that passes through a rotation center of the rotating structure.

17. The multi-line Lidar according to claim 1, wherein one or more beams of the plurality of laser beams emitted by the emission module have an angle changing over time in the vertical direction.

* * * * *